Jan. 24, 1956  P. F. BRONCKHURST  2,731,847
GEAR SHIFTING MECHANISM
Filed Aug. 2, 1954
2 Sheets-Sheet 1

INVENTOR.
Paul F. Bronckhurst
BY
Val R. Goshaw
ATTORNEY.

INVENTOR.
Paul F. Bronckhurst

ATTORNEY.

United States Patent Office 2,731,847
Patented Jan. 24, 1956

2,731,847
GEAR SHIFTING MECHANISM

Paul F. Bronckhurst, Los Angeles, Calif., assignor, by mesne assignments, to the United States of America as represented by the Secretary of the Air Force Application August 2, 1954, Serial No. 447,083

8 Claims. (Cl. 74—339)

This invention relates to a speed changing mechanism, and particularly to a non-clash gear shift mechanism.

Gear shifting mechanisms of various types are well known, some of which provide for the shifting of gears without clash, such as synchro-mesh transmissions. This invention, described hereinafter, is directed to a comparatively simple gear shift mechanism, whereby the driven gear is brought up to the speed of the drive gear before the two gears are brought into mesh. The drive gear is mounted on a rocker arm and in constant mesh with a gear on a splined shaft so that the rocker arm may be shifted axially along the shaft to mesh with driven gears of different diameters. The rocker arm is locked when the drive gear is properly in mesh with any particular driven gear. The shift from one gear to another may be readily made at any time without clashing or grinding of the teeth of the gears to be meshed.

The principal object of the invention, therefore, is to facilitate changing the speed of a driven shaft.

Another object of the invention is to provide an improved gear shifting mechanism.

A further object of the invention is to provide an improved gear shifting mechanism whereby the drive gear is movable to the different stationary positions of a plurality of driven gears and meshed therewith without clashing the gear teeth.

The novel features which are believed to be characteristic of this invention, both as to the manner of its organization and the mode of its operation, will be better understood from the following description, when read in conjunction with the accompanying drawings, in which.

Figure 1:
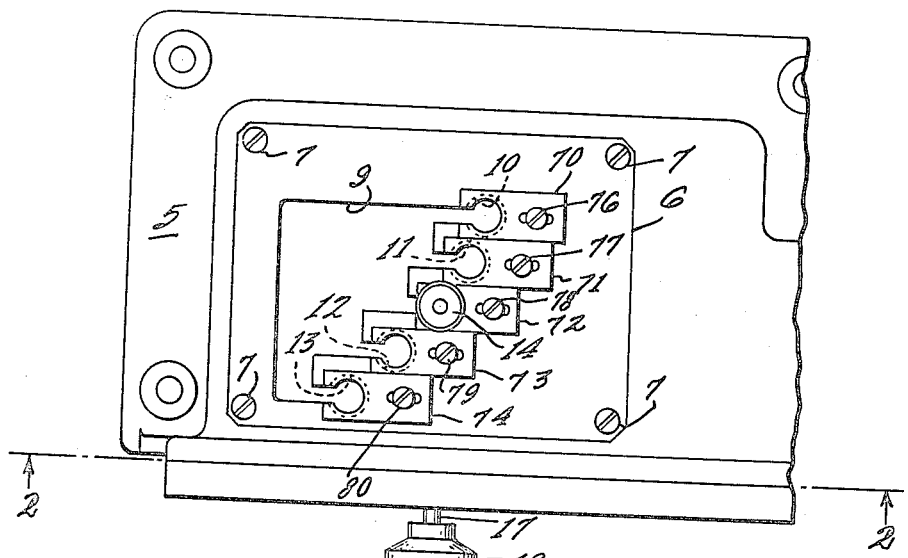
Fig. 1 is a plan view of a gear shifting mechanism embodying the invention.
Figure 2:
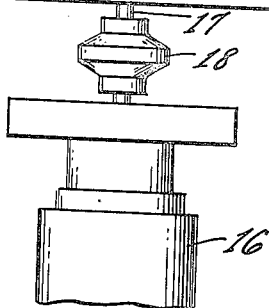
Fig. 2 is a side elevational view of the gear shifting mechanism of Fig. 1 taken along the line 2—2 of Fig 1.
Figure 2:
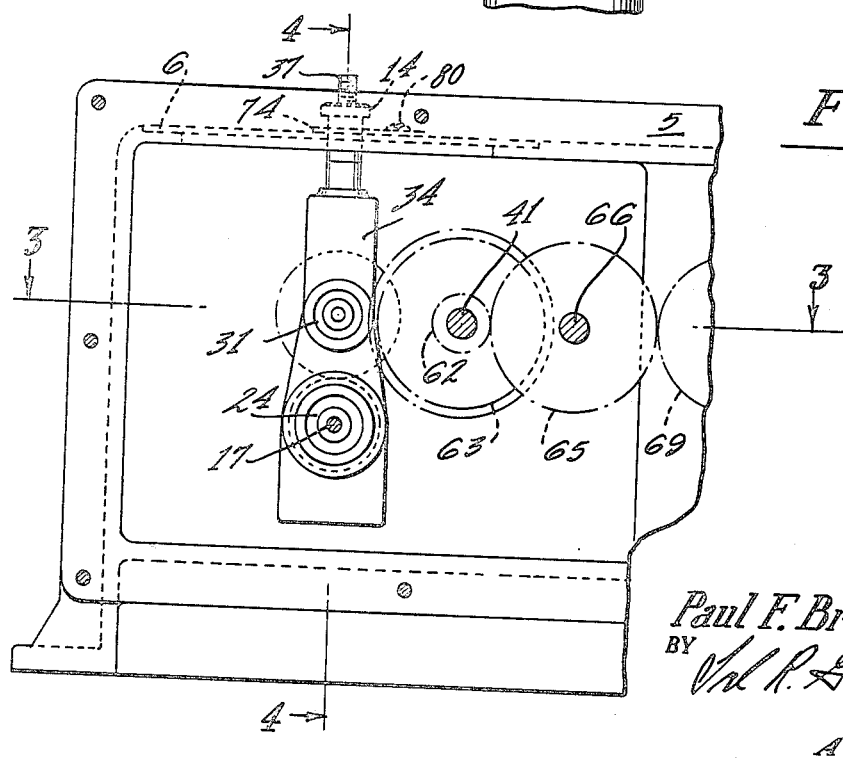

Referring now to the drawings, in which the same numerals identify like elements, a casing or housing 5 has mounted thereon a plate 6 attached to the casing 5 by screws such as shown at 7. The plate has an opening 9 therein provided with a series of circular openings, such as shown at 10, 11, 12, and 13, a similar opening being provided under the finger nut 14. The entrances and exits of the openings are through passages narrower than the diameter of the openings. A motor 16 is shown connected to a shaft 17 through a flexible coupling 18.

Figure 3:
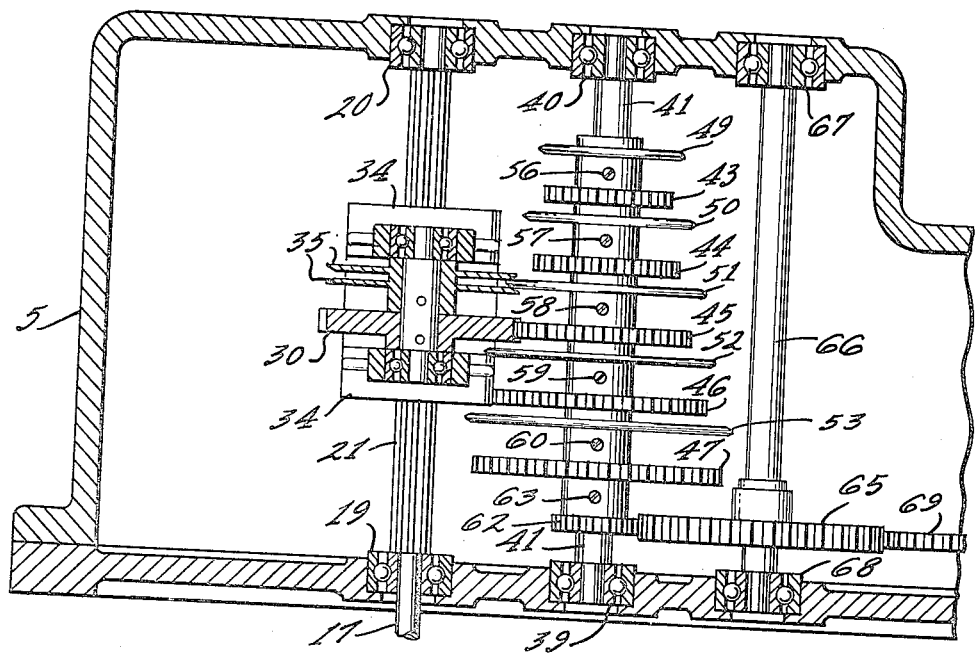
Fig. 3 is a cross-sectional view of the mechanism taken along the line 3—3 of Fig. 2.
Figure 4:
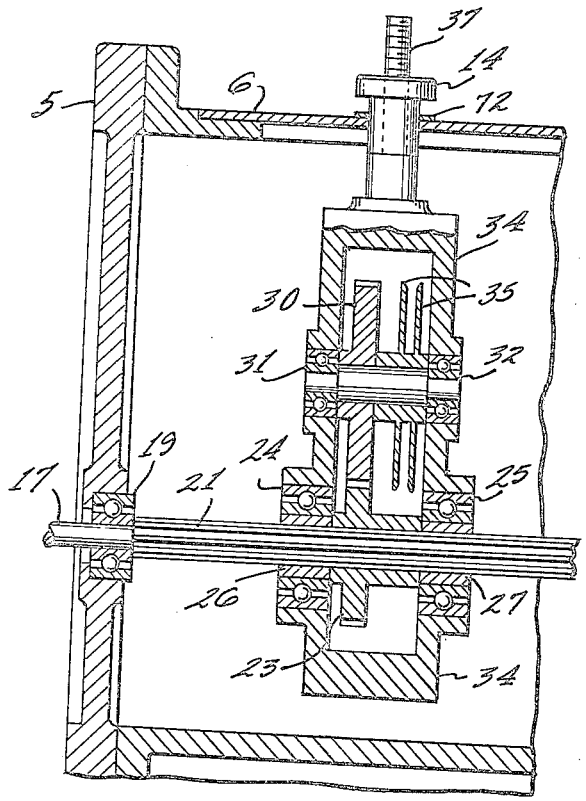
Fig. 4 is a cross-sectional view taken along the line 4—4 of Fig. 2.

Referring particularly to Figs. 3 and 4, the shaft 17 is splined between bearings 19 and 20 mounted in the casing 5. On the spline portion 21 is mounted a gear 23 rotatable on bearings 24 and 25 mounted on sleeves 26 and 27 within a rocker arm 34. Thus, the rotation of spline 21 will rotate the gear 23.

The gear 23 is in constant mesh with a toggle gear 30 rotatable on bearings 31 and 32 in the rocker arm 34. Attached to the gear 30 and rotatable therewith is a pair of discs 35 having substantially the same diameter as the gear 30. The upper portion of the rocker arm has a threaded rod or handle 37, on which is threaded the finger nut 14. Thus, the rocker arm can shift the gears 23 and 30 axially along the spline 21 when the rod 37 is in the opening 9 of plate 6, the rocker arm being rotatable and positioned so that the rod 37 may fit into the various openings 10, 11, 12, and 13, as shown in Fig. 1.

Mounted on plate 6 over each of the circular openings are thin rectangular plates 70, 71, 72, 73, and 74, which have holes therein smaller than the openings in plate 6, such as 10, 11, 12, and 13. The plates are adjustable along slots therein in which are screws 76, 77, 78, 79, and 80 for maintaining the plates in adjusted positions. The shank of the finger nut 14 has a diameter which will just be accommodated in the openings in the thin plates, but which diameter is larger than the entrances to and exits from the openings. Thus, when the finger nut 14 is moved into any particular opening, it will lock the rocker arm 34 in place, the position of the rocker arm being such as to obtain the proper meshing of the gears. Since the plates 70 to 74, inclusive, are thin, the nut 14 can assume the angle of the rocker arm in the openings. Thus, to move the rocker arm, the finger nut must be raised above the plate 6 and thin plates 70 to 74, inclusive, so that the rod 37 may pass through the narrow entrances to and exits from the openings and holes.

Mounted on bearings 39 and 40 in the casing 5 is a shaft 41, on which is mounted a plurality of gears having different diameters, such as gears 43, 44, 45, 46, and 47. On the hub of each of these gears are respective friction discs 49, 50, 51, 52, and 53. All of the discs and gears just mentioned are fixedly attached to the shaft 41 by set screws 56, 57, 58, 59, and 60. Another gear 62 is attached to the shaft 41 by set screw 63, this latter gear being in mesh with a gear 65 on a shaft 66 mounted in bearings 67 and 68. The gear 65 may be in mesh with another gear, such as 69, depending on the load to be driven.

The operation of the gear shift mechanism above described is simple, since it is only necessary to move the rocker arm 34 along the spline 21 to one of the positions of the openings 10, 11, 12, and 13, or the opening under the finger nut 14. For instance, if it is desired to mesh gears 30 and 43, the rocker arm is moved to the position of opening 10. When this position is reached, the gear 30 is moved toward the gear 43, but before the teeth of the gears contact, the disc 49 of gear 43 will be inserted between the outer edges of the pair of discs 35. The peripheral speed of gear 43 is thus brought up to substantially the same peripheral speed of the gear 30, and the gears will then mesh without clashing or grinding of the teeth. As shown in the drawings, the gear 30 is in mesh with gear 45, its associated disc 51 being shown in frictional engagement with the pair of discs 35. The pair of discs 35 are thinner than the discs 49 to 53, inclusive, so that they are sufficiently flexible to permit easy contact between the respective discs. The discs also have tapered edges to aid the engagement between discs.

The gear shifting mechanism above described is rugged, simple, economical, and is operable during high speeds of rotation of the gear 30. Since each respective gear is brought up to the speed of the drive gear by frictional engagement with its corresponding disc of the proper size, there is no clashing or grinding of gears.

I claim:

1. A gear shifting machanism comprising a casing, a splined drive shaft rotatable in said casing, a rocker arm having a gear mounted on said splined shaft and rotatable by and with said shaft, a second gear in constant mesh with said first gear, means for mounting said second gear on said arm, said second gear being adapted to be moved in an arc about said splined shaft, a second shaft mounted in said casing parallel with said splined shaft, a plurality of driven gears of different diameters mounted on said second shaft, means rotatable with said second gear, and means associated with each of said gears on said second shaft for frictionally contacting said means rotatable with said second gear at mutually exclusive times for rotating said respective gear at substantially the same speed of said second gear.

2. A gear shifting mechanism in accordance with claim 1, in which said rocker arm has means associated therewith for locking said second gear in proper meshing position with respect to a respective driven gear, said means including adjustable plates for predetermining the respective positions of said rocker arm.

3. A gear shifting mechanism in accordance with claim 1, in which said means rotatable with said second gear is at least one friction disc and said means associated with each of said gears on said second shaft is at least one friction disc adapted to contact said first mentioned disc before any driven gear meshes with said second gear.

4. A gear shifting mechanism in accordance with claim 1, in which said means rotatable with said second gear is a pair of parallel discs and said means associated with each of said gears on said second shaft is a disc adapted to have a portion thereof positioned between the edges of said pair of discs.

5. A gear shifting mechanism comprising a drive shaft, a gear on and driven by said shaft and movably axially along said shaft, a second gear in constant mesh with said first gear, an arm on which said second gear is rotatable, said arm being movable on and along said drive shaft to move said gears to different positions along said drive shaft, a plurality of gears of different diameters adapted to be driven by said second gear, means rotated by said second gear, and means connected to each of said plurality of gears for frictionally contacting said means rotated by said second gear to rotate said respective gear to substantially the same peripheral speed as said second gear.

6. A gear shifting mechanism in accordance with claim 5, in which said first mentioned means is at least one frictional disc mounted on and parallel with said second gear and having substantially the same diameter of said second gear, and said second mentioned means is a disc mounted on and parallel with each of said plurality of gears and having substantially the same diameter as the respective gears on which it is connected.

7. A gear shifting mechanism in accordance with claim 6, in which are provided a plate having a large opening through which said arm extends, and smaller openings, each of which correspond in position to one of said plurality of gears, and smaller adjustable plates having holes smaller than said openings and substantially coincident therewith.

8. A gear shifting mechanism in accordance with claim 7, in which a nut is threaded on said arm for movement into said holes to lock said arm in any particular position.

References Cited in the file of this patent

UNITED STATES PATENTS

| 936,338 | Mayo | Oct. 12, 1909 |
| 1,198,000 | Beemer | Sept. 12, 1916 |
| 1,764,333 | Murray | June 17, 1930 |

FOREIGN PATENTS

| 278,327 | Germany | Sept. 24, 1914 |
| 437,301 | Germany | Nov. 18, 1926 |
| 441,835 | Germany | Mar. 14, 1927 |
| 863,753 | Germany | Jan. 19, 1953 |